United States Patent [19]
Chen

[11] Patent Number: 5,394,600
[45] Date of Patent: Mar. 7, 1995

[54] METHOD FOR MAKING A SCREEN

[76] Inventor: Chao-Ho Chen, No. 3-1, Pei-Shan Chuang, Fu-Chu Tsun, Ta-An Hsiang, Taichung Hsien, Taiwan, Prov. of China

[21] Appl. No.: 195,876

[22] Filed: Feb. 14, 1994

[51] Int. Cl.$^6$ .............................................. B23P 11/02
[52] U.S. Cl. ...................................... 29/447; 29/902; 29/DIG. 35
[58] Field of Search ......... 29/447, 462, 902, DIG. 35, 29/DIG. 94, 160, 163.6; 403/273; 162/55; 209/393, 395, 406; 210/497.01, 497.2, 415

[56] References Cited

U.S. PATENT DOCUMENTS

| | | | |
|---|---|---|---|
| 5,090,721 | 2/1992 | Lange | 29/163.6 |
| 5,094,360 | 3/1992 | Lange | 29/163.6 |
| 5,200,072 | 4/1993 | Frejborg et al. | 29/447 |

FOREIGN PATENT DOCUMENTS

| | | | |
|---|---|---|---|
| 2061290 | 8/1992 | Canada | 209/393 |
| 209434 | 12/1983 | Japan | 29/447 |

*Primary Examiner*—Mark Rosenbaum
*Assistant Examiner*—David P. Bryant
*Attorney, Agent, or Firm*—Merchant, Gould, Smith, Edell, Welter & Schmidt

[57] ABSTRACT

A method for making a screen includes preparing a plurality of elongated supporting plates, each of which being formed with a plurality of transversely and spacedly arranged grooves, and arranging the elongated supporting plates spacedly in a parallel manner to align the grooves on one of the elongated supporting plates with the grooves on an adjacent one of the elongated supporting plates; preparing a plurality of elongated bars, each of which being formed integrally with a longitudinal constricted portion, the longitudinal constricted portion normally having a transverse width wider than that of the grooves; heating the elongated supporting plates to expand the grooves; inserting the longitudinal constricted portion of each of the elongated bars into expanded grooves in order to juxtapose parallel the elongated bars and to form slots therebetween; and cooling the elongated supporting plates in order to permit contraction of the elongated supporting plates and the grooves so as to hold tightly the elongated bars.

3 Claims, 5 Drawing Sheets

METHOD FOR MAKING A SCREEN

BACKGROUND OF THE INVENTION

1. Field of the Invention

This invention relates to a method for making a screen, more particularly to a method for making a screen for filtering pulp during the manufacturing of paper.

2. Description of the Related Art

In paper manufacturing, pulp is sifted through a series of pulp screens of screening machines in order to sort pulp according to size. Referring to FIGS. 1 and 2, a conventional pulp screen 1 has a plurality of spaced annular supporting members 21 and a plurality of parallel elongated strips 3 attached to the annular supporting members 21 to form slots 31 therebetween. Referring again to FIG. 2, in order to make the conventional pulp screen 1, elongated supporting plates 2 are disposed spacedly from one another. Elongated strips 3 are juxtaposed parallel to one another and are welded transversely to the elongated supporting plates 2 to form a screen plate with a plurality of slots 31. The screen plate is then rolled to form the pulp screen 1 with a cylindrical shape. A main drawback in this method for making the conventional pulp screen 1 is that the welded portions of the elongated supporting plates 2 and the elongated strips 3 are prone to deformation as a result of bending stress present during the rolling process. Furthermore, the welding process is time-consuming and is not convenient, thereby lowering the efficiency and increasing the manufacturing cost.

SUMMARY OF THE INVENTION

Therefore, the objective of this invention is to provide an improved method for making a screen used to filter pulp during the manufacturing of paper. By employing the improved method of this invention, the screen can be made quickly and conveniently, and can have a strong structure without the risk of deformation.

Accordingly, the screen-making method of this invention includes the steps of: preparing a plurality of elongated supporting plates, each of which being formed with a plurality of transversely and spacedly arranged grooves, and arranging the elongated supporting plates spacedly in a parallel manner to align the grooves on one of the elongated supporting plates with the grooves on an adjacent one of the elongated supporting plates; preparing a plurality of elongated bars, each of which being formed integrally with a longitudinal constricted portion, the longitudinal constricted portion normally having a transverse width wider than that of the grooves of the elongated supporting plates; heating the elongated supporting plates to expand the grooves; inserting the longitudinal constricted portion of each of the elongated bars into expanded grooves of the elongated supporting plates in order to juxtapose parallel the elongated bars and to form slots therebetween; and cooling the elongated supporting plates in order to permit contraction of the elongated supporting plates and the grooves so as to hold tightly the elongated bars. In this way, a plate-like screen can be made. The screen-making method of this invention can further comprise a rolling step to roll the plate-like screen into a cylindrical screen.

BRIEF DESCRIPTION OF THE DRAWINGS

Other features and advantages of the present invention will become apparent in the following detailed description of the preferred embodiment, with reference to the accompanying drawings, in which.

DETAILED DESCRIPTION OF THE PREFERRED EMBODIMENT

Figure 1:
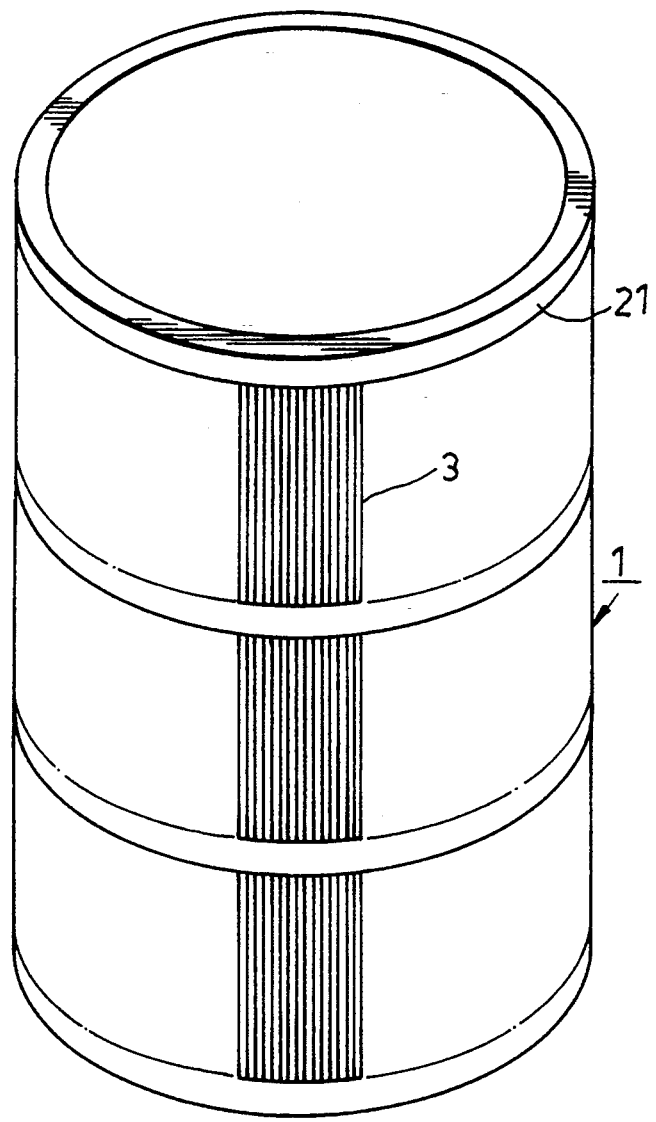
FIG. 1 is a perspective view of a conventional pulp screen.
Figure 2:
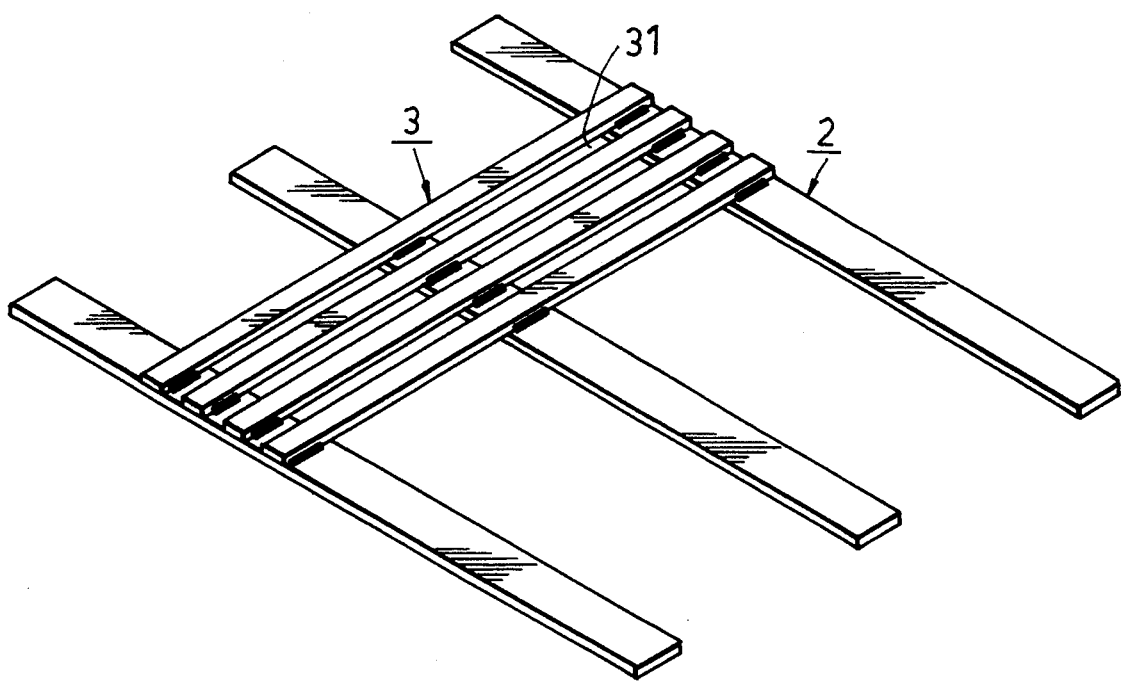
FIG. 2 shows the elongated supporting plates and elongated strips of the conventional pulp screen.
Figure 3:
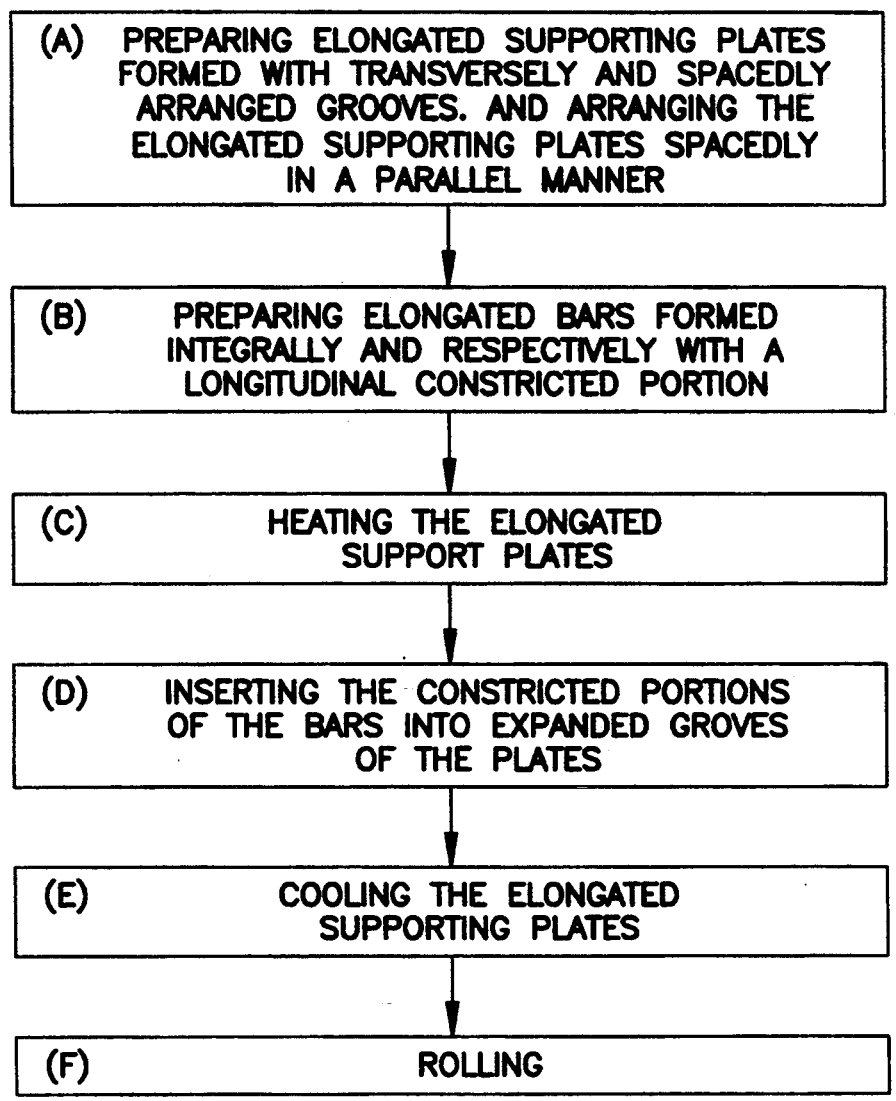
FIG. 3 is a flow diagram showing the steps of the method for making a screen according to this invention.

Referring to FIG. 3, the pulp screen-making method of this invention includes the steps of (a) preparing a plurality of elongated supporting plates, each of which being formed with a plurality of transversely and spacedly arranged grooves, and arranging the elongated supporting plates spacedly in a parallel manner to align the grooves on one of the elongated supporting plates with the grooves on an adjacent one of the elongated supporting plates; (b) preparing a plurality of elongated bars, each of which being formed integrally with a longitudinal constricted portion, the longitudinal constricted portion normally having a transverse width wider than that of the grooves of the elongated supporting plates when the elongated supporting plates and the elongated bars are at the same temperature; (c) heating the elongated supporting plates to expand the grooves; (d) inserting the longitudinal constricted portion of each of the elongated bars into expanded grooves of the elongated supporting plates in order to juxtapose parallel the elongated bars and to form slots therebetween; (e) cooling the elongated supporting plates at room temperature in order to permit contraction of the elongated supporting plates and the grooves so as to hold tightly the elongated bars, thereby forming a plate-like screen; and (f) rolling the plate-like screen into a cylindrical screen.

Figure 4:
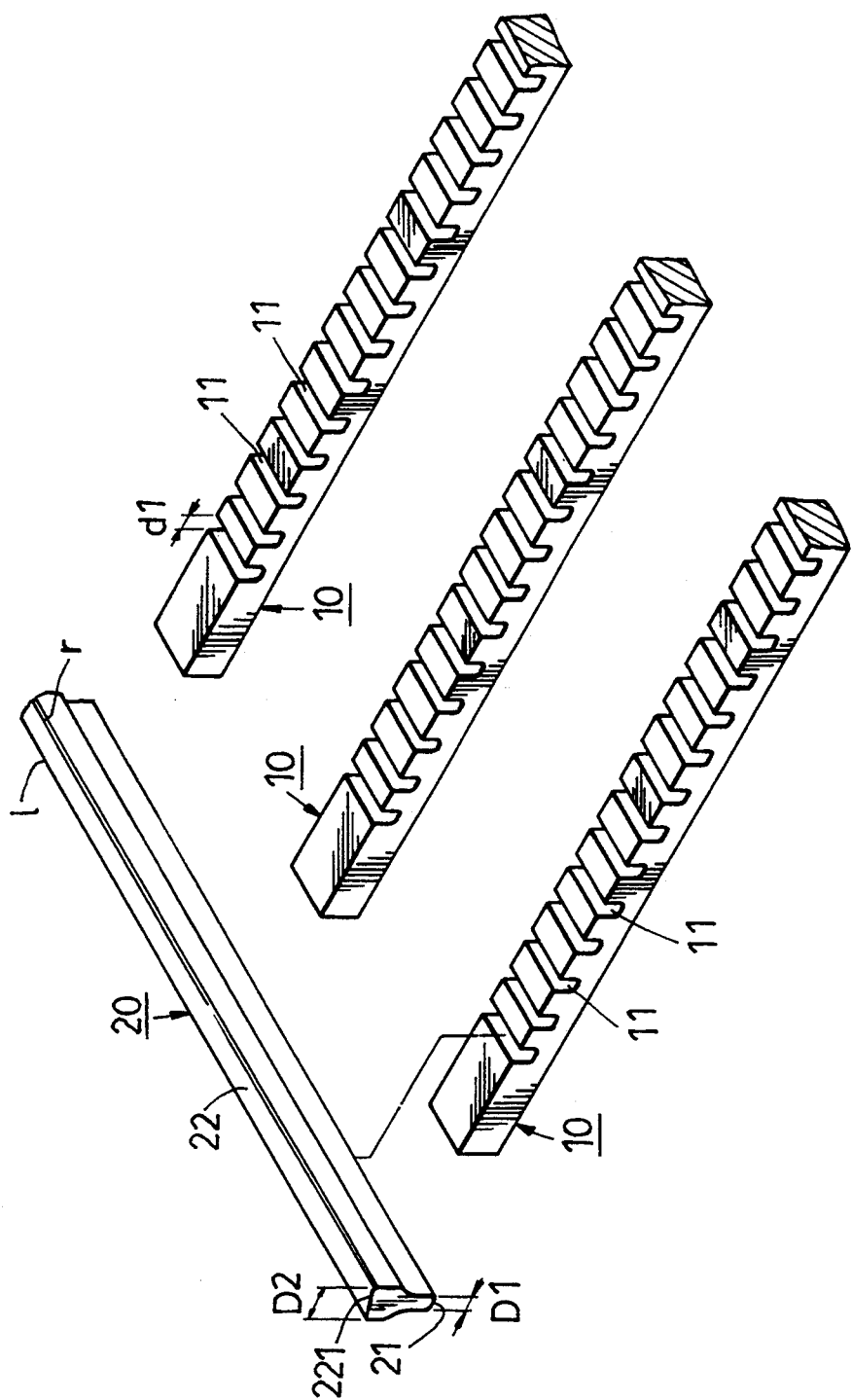
FIG. 4 is a schematic view showing the elongated supporting plates and the elongated bar used for the screen according to this invention.
Figure 5:
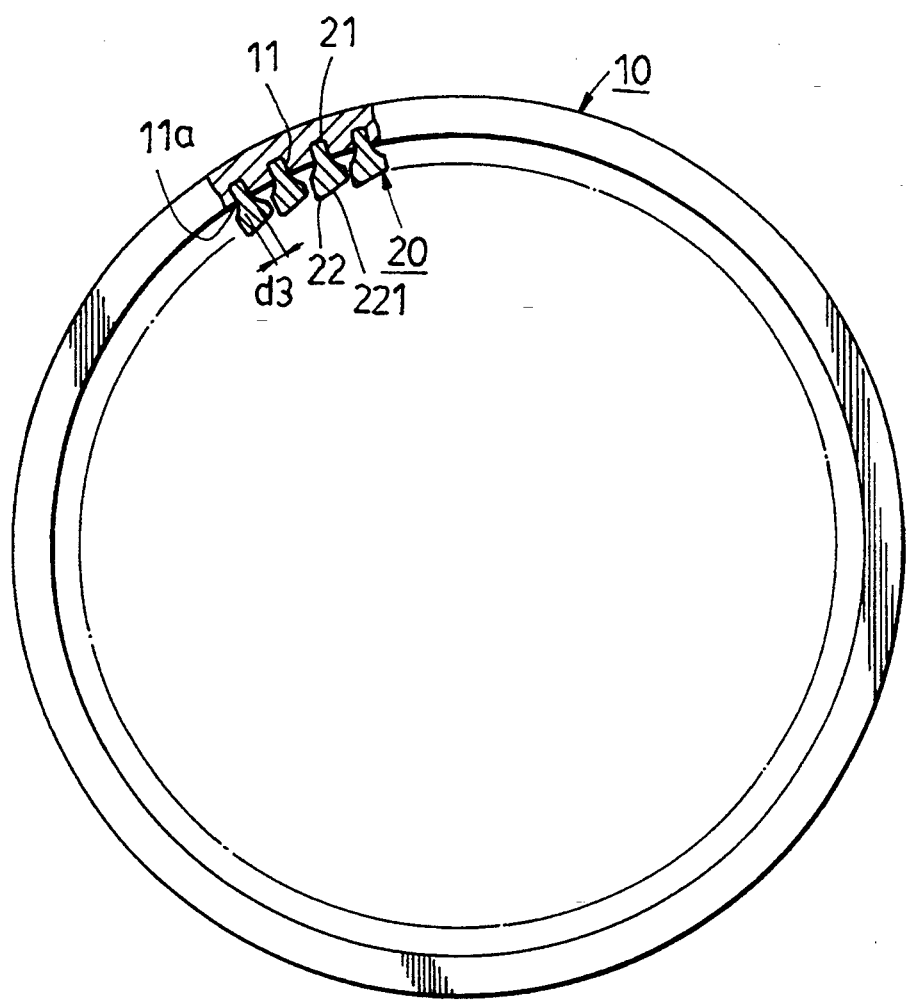
FIG. 5 is a sectional view showing the engagement between the elongated supporting plate and the elongated bar shown in FIG. 4.

Referring to FIGS. 4 and 5, in order to make a screen, a plurality of elongated supporting plates 10 and a plurality of elongated bars 20 are prepared. Each of the elongated supporting plates 10 is formed with a plurality of parallel transverse grooves 11 which are arranged at fixed intervals. Each groove 11 is formed with a curved bottom and has a uniform transverse width (d1). The elongated supporting plates 10 are placed in a parallel manner in order to align the grooves 11 on one of the elongated supporting plates 10 with the grooves 11 on an adjacent one of the elongated supporting plates 10. Each of the elongated bars 20 is formed integrally with a lower longitudinal constricted portion 21 and an upper longitudinal enlarged portion 22 with a uniform transverse width (D2). The longitudinal constricted portion 21 is formed with a curved bottom and has a transverse cross-section with a uniform transverse width (D1). It is noted that the shape of the longitudinal constricted portion 21 conforms with that of the groove 11 of the elongated supporting plate 10, and that the width (D2) is larger than the width (D1) while the width (D1) is larger than the width (d1) when the elongated supporting plates 10 and the elongated bars 20 are at the same temperature. Each elongated bar 20 has a top surface 221 inclining gradually from a first side (r) toward a second side (l) thereof. In order to mount the elongated bars 20 on the elongated supporting plates 10, the elongated supporting plates 10 are heated until the temperature thereof reaches 150°–250° C., thereby expanding the grooves 11. At this time, the longitudinal constricted portion 21 of each of the elongated bars 20 is inserted into and engages one of the grooves 11 of each of the elongated supporting plates 10 in order to juxtapose parallel the elongated bars 20 at intervals and to form slots therebetween. The elongated supporting plates 10 and the elongated bars 20 are then cooled at room temperature in order to permit contraction of the elongated supporting plates 10 and the grooves 11 so as to hold tightly the elongated bars 20, thereby forming a plate-like screen (not shown). Afterwards, the plate-like screen further undergoes a rolling process to form a cylindrical screen. Referring again to FIG. 5, it is noted that the elongated bars 20 are disposed on an inner side of the elongated supporting plates 10. After the plate-like screen is rolled, the elongated bars 20 are held tightly by the elongated supporting plates 10 due to bending of the elongated supporting plates 10. In this way, the elongated bars 20 can be secured firmly to the elongated supporting plates 10, and since the resulting cylindrical screen did not undergo a welding operation, little or no deformation is encountered.

Referring again to FIG. 4, the width of the groove 11 is originally (d1), which is smaller than the width (D1) of the longitudinal constricted portion 21. After heating, the width of the groove 11 is enlarged due to thermal expansion so as to be larger than the width (D1) of the longitudinal constricted portion 21, thereby permitting the reception of the longitudinal constricted portion 21 therein. During cooling, the groove 11 contracts to hold tightly the longitudinal constricted portion 21 therein. Referring again to FIG. 5, the width of the inner end (11a) of the groove 11 is decreased to (d3), which is smaller than the original width (d1), after rolling, thereby facilitating tight engagement of the elongated bars 10.

During the manufacturing process, automatic machines, i.e. automatic conveying belts, can be used to carry the heated elongated supporting plates 10, and the elongated bars 20 can be inserted automatically into the elongated supporting plates 10 with the application of mechanical forces. The rolling process is then performed. Thus, according to the making method of this invention, the resulting cylindrical screen can be made quickly and conveniently, thereby reducing the manufacturing time and costs involved.

I claim:

1. A method for making a screen, comprising the steps of:
    preparing a plurality of elongated supporting plates, each of which being formed with a plurality of transversely and spacedly arranged grooves, and arranging said elongated supporting plates spacedly in a parallel manner to align said grooves on one of said elongated supporting plates with said grooves on an adjacent one of said elongated supporting plates;
    preparing a plurality of elongated bars, each of which being integrally formed with a longitudinal constricted portion, said longitudinal constricted portion having a transverse width wider than that of said grooves of said elongated supporting plates;
    heating said elongated supporting plates to expand said grooves;
    inserting said longitudinal constricted portion of each of said elongated bars into said expanded grooves of said elongated supporting plates in order to juxtapose said parallel said elongated bars and to form slots therebetween; and
    cooling said elongated supporting plates in order to permit contraction of said elongated supporting plates and said grooves so as to tightly hold said elongated bars therein.

2. A method as claimed in claim 1, further comprising rolling said elongated supporting plates and said elongated bars after the cooling step in order to form said screen with a cylindrical shape.

3. A method as claimed in claim 1, wherein said elongated supporting plates are heated until the temperature thereof reaches 150°–250° C.

* * * * *